United States Patent [19]

Kurz

[11] 4,368,306

[45] Jan. 11, 1983

[54] PROCESS AND CATALYST FOR THE POLYMERIZATION OF α-OLEFINS

[75] Inventor: Dieter Kurz, Burghausen, Fed. Rep. of Germany

[73] Assignee: Wacker-Chemie GmbH, Munich, Fed. Rep. of Germany

[21] Appl. No.: 259,538

[22] Filed: May 1, 1981

[30] Foreign Application Priority Data

Jul. 8, 1980 [DE] Fed. Rep. of Germany ....... 3025760

[51] Int. Cl.$^3$ .......................... C08F 4/02; C08F 10/00
[52] U.S. Cl. ................................ 526/125; 252/429 B; 526/114; 526/116; 526/119; 526/142; 526/352
[58] Field of Search ................ 526/114, 116, 119, 125

[56] References Cited

U.S. PATENT DOCUMENTS 4,109,071  8/1978  Berger et al. ...................... 526/125
4,115,319  9/1978  Scata et al. .......................... 526/125

FOREIGN PATENT DOCUMENTS 876093  8/1961  United Kingdom ................ 526/114

*Primary Examiner*—Edward J. Smith

*Attorney, Agent, or Firm*—Hammond & Littell, Weissenberger & Muserlian

[57] ABSTRACT

Poly-α-olefins, particularly polyethylene, having a broad molecular weight distribution, can be prepared discontinuously or continuously in the gaseous phase or in hydrocarbons as dispersants, at a pressure of from 2 to 40 bar and at a temperature of from 60° C. to 100° C., optionally with the use of hydrogen as a molecular weight regulator in the presence of a catalyst solid which is manufactured in two reaction steps, from a primary solid containing magnesium and chlorine which has been reacted, in a reaction stage A, with peroxy compound(s) and with halogen-containing metal compounds of elements of IV and/or V subgroup(s) of the Mendeleev Periodic Table and, in reaction stage B, with halogen-containing metal compounds of elements of IV and/or V subgroup(s) of the Mendeleev Periodic Table, and/or metal organyl compounds of metals of the II and/or III main group(s) of the Mendeleev Periodic Table. The sequence of the reaction stages A and B is not critical for the success of the process according to the invention.

17 Claims, No Drawings nesium and halogen in two successive reacting stages A and B, in either order, where a solid based on magnesium compound(s) is reacted in reaction stage A with:
(i) at least one peroxy compound, and
(ii) at least one halogen-containing metal compound of one or more elements of the IV and/or V subgroup(s) of the Mendeleev Periodic Table, and, in reaction stage B, a solid based on magnesium compound(s) is reacted with
(i) at least one halogen-containing metal compound of one or more elements of the IV and/or V subgroup(s) of the Mendeleev Periodic Table, and
(ii) at least one organometallic compound where said metal is from the II and/or III main group(s) of the Mendeleev Periodic Table, whereby a polymerizate is recovered having a broad molecular weight distribution.

These and other objects of the invention will become more apparent as the description thereof proceeds.

DESCRIPTION OF THE INVENTION

The above objects have been achieved by the present invention.

The subject of the invention is a process for the discontinuous or continuous polymerization of α-olefins, in the gaseous phase or in hydrocarbons as a dispersing media, at a pressure of from 2 to 40 bar, preferably up to approximately 15 bar and at a temperature of from 60° to 100° C., optionally with the use of hydrogen as molecular weight regulator, in the presence of a solid material as catalyst that contains elements of the IV and/or V subgroup(s) of the Mendeleev Periodic Table of Elements, magnesium, halogen, oxygen and, optionally, a (further) element of the II and/or III main group(s) of the Periodic Table and that is activated by organometallic compounds of metals of the II and/or III main group(s) of the Periodic Table, characterized in that the catalyst, which is subsequently still to be activated for use in the polymerization of α-olefins, is prepared by reacting a primary solid containing magnesium and halogen in two successive reaction stages A and B, wherein the solid based on magnesium compound(s) is treated in reaction stage A with peroxy compound(s) and with halogen-containing metal compound(s) of one or more elements of the IV and/or V subgroup(s) of the Periodic Table, and in reaction Stage B is reacted with halogen-containing metal compounds of elements of the IV and/or V subgroup(s) and at least one organometallic compound of metals of the II and/or III main group(s) of the Periodic Table.

Compared to known catalysts of this type, the catalysts according to the invention give a polymerizate of an α-olefin, particularly ethylene, with a broad molecular weight distribution, good physical properties, good processibility and good purity.

More particularly, the present invention relates to a catalyst for the polymerization of an at least one α-olefin to give a polymerizate having a broad molecular weight distribution consisting essentially of a solid compound containing:
(1) element(s) of the IV and/or V subgroup(s) of the Mendeleev Periodic Table,
(2) magnesium,
(3) halogen,
(4) oxygen, and possibly
(5) element(s) of the II and/or III main group(s) of the Mendeleev Periodic Table, which solid compound is activated with at least one organometallic compound where said metal is from the II and/or III main group(s) of the Mendeleev Periodic Table, wherein said solid compound, prior to activation, is prepared by reacting a primary solid containing magnesium and halogen in two successive reacting stages A and B, in either order, where a solid based on magnesium compound(s) is reacted in reaction stage A with:
(i) at least one peroxy compound, and
(ii) at least one halogen-containing metal compound of one or more elements of the IV and/or V subgroup(s) of the Mendeleev Periodic Table, and, in reaction stage B, a solid based on magnesium compound(s) is reacted with:
(i) at least one halogen-containing metal compound of one or more elements of the IV and/or V subgroup(s) of the Mendeleev Periodic Table, and
(ii) at least one organometallic compound where said metal is from the II and/or III main group(s) of the Mendeleev Periodic Table;

as well as the polymerizate produced employing the above catalyst.

The term "a compound containing an element" is understood to mean that the mentioned element is chemically bonded in the mentioned compound, and the term "Periodic Table" is understood to mean the Periodic Table according to Mendeleev (see "Handbook of Chemistry and Physics," 55th Edition, inside cover).

All α-olefins that could previously be polymerized at pressures of from approximately 2 to 40 bar in the presence of solid catalysts of the so-called "Ziegler type" may be used as α-olefins that may be polymerized in accordance with the process of the invention. Ethylene, which is used along or copolymerized in admixture with up to 10 mol percent of α-alkenes having 3 to 6 carbon atoms, is preferred.

To prepare the catalyst used in the process according to the invention, a primary solid containing magnesium and halogen is used as starting material. This primary solid may preferably be produced by reacting hydrocarbon-soluble magnesium compound(s) with a chlorohydrocarbon and/or carbon chloride compound(s) having in each case from 1 to 6 carbon atoms, of which at least one carries at least two directly bonded chlorine atoms.

Suitable hydrocarbon-soluble magnesium compounds, which may be used alone or in admixture, are especially organomagnesium compounds of the general formulae:

in which $R^1$ and $R_2$ are identical or different, straight-chain or branched alkyl radicals having from 2 to 20 carbon atoms or hydrocarbon aryl radicals having from 6 to 20 carbon atoms.

$R^1MgR^2$ compounds are especially preferred, for example, n-butyl-ethyl magnesium, di-n-butyl magnesium, n-butyl-isobutyl magnesium, n-butyl-sec-butyl magnesium, di-n-hexyl magnesium, di-n-pentyl magnesium, di-n-octyl magnesium, di-phenyl magnesium or mixtures of these compounds.

These organomagnesium compounds are especially preferably reacted with saturated chlorohydrocarbon and/or carbon chloride compounds, such as carbon tetrachloride, 1,1,1-trichloroethane, 1,1,2-trichloroethane, 1,1,2,2-tetrachloroethane, 1,1,1,2-tetrachloroethane, pentachloroethane, hexachloroethane or mix-

PROCESS AND CATALYST FOR THE POLYMERIZATION OF α-OLEFINS

BACKGROUND OF THE INVENTION

The polymerization of α-olefins, especially ethylene, in the gaseous phase or in hydrocarbons as diluents and dispersants, with the aid of solid catalysts that contain elements IV and/or V subgroup(s) of the Mendeleev Periodic Table, magnesium, halogen, oxygen and, optionally, boron or aluminum, and that have been activated with an alkyl aluminum, is known.

Because of the properties of the polyolefins thus prepared are very strongly dependent on the catalyst used, various catalyst systems have already been proposed for the polymerization of the α-olefins.

In the polymerization of α-olefins, especially ethylene, the majority of the previously known solid catalysts activated with an alkyl aluminum yield products having a narrow molecular weight distribution, that is to say, the mean polymerization degree of a polyolefin mixture produced in a polymerization batch lies within a narrow range. This narrow molecular weight distribution of the polymerizate means that extruded products prepared therefrom have rough surfaces as a result of "melt fractures," so that these polymerizates are unsuitable for many uses, for example, for the manufacture of hollow articles and sheet materials.

The problem was, therefore, to manufacture polyolefins having a broad molecular weight distribution.

Of the few known catalyst systems that yield products having a broad molecular weight distribution, the majority cannot be used on an industrial scale because the grain properties of the polymerization product do not satisfy the requirements of the polymerization, working-up or further processing, or because the molecular weight distribution is not sufficiently broad for many fields of application.

A further group of these catalyst systems has an unsatisfactory catalyst activity so that relatively large quantities have to be employed which pass into the polymerizate, impair its properties, especially its stability and, therefore, have to be rendered harmless or removed in complicated subsequent processes, or they do not display adequate activity until the polymerization pressures are very high. Such systems, however, can be used only in special polymerization reactors having a very high resistance to pressure and with a high energy consumption.

Another group of these known systems yields products having broadly distributed molecular weights only when the polymerization is carried out in the presence of special activator mixtures, which have to be adhered to accurately, and another group only when the polymerization is carried out in the presence of additional auxiliaries, which subsequently have to be removed from the polymerization medium.

A further group of such known catalyst systems is unsuitable for use on a commercial scale because the physical properties, such as rigidity, impact strength and stress-crack resistance, of the shaped articles produced from the polymerization product are inadequate for many purposes.

Some catalysts also discolor the product. These undesirable discolorations are caused chiefly by residual traces of catalyst, which, moreover, in many cases impair the stability of the product to light.

Reference is made to German Published Application DE-OS 26 35 298, which is equivalent to U.S. Pat. No. 4,064,334 in that both claim the same priority for an example of a previously known catalyst. This catalyst is produced by grinding a mixture of magnesium halide, an alkoxy aluminum halide, a tetravalent titanium compound and a trivalent titanium compound. However, wall deposits are formed during polymerization, and the polymerizates themselves have a poor powder flow behavior, a low bulk density and a high proportion of fines.

OBJECTS OF THE INVENTION

An object of the present invention is to make available a polymerization process for α-olefins, particularly ethylene, which yields products having a broad molecular weight distribution, good physical properties, good processibility and good purity.

Another object of the present invention is the development of a catalyst for the polymerization of an at least one α-olefin to give a polymerizate having a broad molecular weight distribution consisting essentially of a solid compound containing:
 (1) element(s) of the IV and/or V subgroup(s) of the Mendeleev Periodic Table,
 (2) magnesium,
 (3) halogen,
 (4) oxygen, and possibly
 (5) element(s) of the II and/or III main group(s) of the Mendeleev Periodic Table,
which solid compound is activated with at least one organometallic compound where said metal is from the II and/or III main group(s) of the Mendeleev Periodic Table, wherein said solid compound, prior to activation, is prepared by reacting a primary solid containing magnesium and halogen in two successive reacting stages A and B, in either order, where a solid based on magnesium compound(s) is reacted in reaction stage A with:
 (i) at least one peroxy compound, and
 (ii) at least one halogen-containing metal compound of one or more elements of the IV and/or V subgroup(s) of the Mendeleev Periodic Table,
and in reaction stage B, a solid based on magnesium of one or more elements of the IV and/or V subgroup(s) of the Mendeleev Periodic Table, and
 (ii) at least one organometallic compound where said metal is from the II and/or III main group(s) of the Mendeleev Periodic Table.

A further object of the present invention is the development of an improvement in the process for the polymerization of an at least one α-olefin comprising reacting said α-olefin under elevated temperatures and pressures in the presence of a solid polymerization catalyst consisting essentially of a solid compound containing:
 (1) element(s) of the IV and/or V subgroup(s) of the Mendeleev Periodic Table,
 (2) magnesium,
 (3) halogen,
 (4) oxygen, and possibly
 (5) element(s) of the II and/or III main group(s) of the Mendeleev Periodic Table,
which solid compound is activated with at least one organometallic compound where said metal is from the II and/or III main group(s) of the Mendeleev Periodic Table, and recovering a polymerizate, the improvement consisting of preparing said solid compound prior to activation, by reacting a primary solid containing magtures of these compounds. Chloroform is especially preferred, however.

The magnesium compound(s) and the organic chlorine compound, for example, especially chloroform, are preferably reacted in quantities of from 0.5 to 10, and especially 1 to 4, mols of chlorine compond per mol of magnesium compound, preferably at temperatures of from −10° to 150° C., especially from 20° to 80° C., while stirring.

The duration of the reaction and the degree of dilution of the reactants is largely unimportant here. The reaction can be carried out within a few minutes or over several hours, for example, over a period ranging from 30 to 120 minutes. The degree of dilution can be varied within wide limits; for example, the organic chlorine compound, such as the especially preferred chloroform, can be used in pure form or dissolved in hydrocarbons. The organomagnesium compound must be dissolved homogeneously in hydrocarbons, however, before commencing the reaction.

The reaction may be carried out in such a manner that the organic chlorine compound is added in portions to the dissolved magnesium compound, while stirring, or both reactants are metered simultaneously into the reaction container, while stirring. Preferably, however, the organic chlorine compound of the above-defined type, especially chloroform, is introduced in pure form or homogeneously dissolved in hydrocarbons, and the hydrocarbon solution of the organomagnesium compound(s) is added in portions, while stirring, because, in this manner, a catalyst solid especially well suited to the process of the invention can be produced.

The primary solid containing chlorine and magnesium and manufactured in the manner described can be further used directly, but preferably it is washed several times with hydrocarbons before further treatment.

A hydrocarbon or a mixture of hydrocarbons is then added to the primary solid so that a stirrable suspension is formed. The concentration is not critical but should be as concentrated as possible owing to the improved handling and the improved further reaction in the first reaction stage which then follows.

The order of the two successive reaction stages A and B is not critical for the success of the catalyst production or the polymerization process according to the invention. Thus, primary solid material prepared in the above-described manner may first be subjected to reaction stage A and, when this has finished, either reacted directly, or after an intermediate purification step, in reaction B. However, the reverse order of the reaction stages, preferably with an intermediate purification step, that is to say, reaction stage B before reaction stage A, is preferred.

The primary solid (or in the preferred embodiment of the preparation of the catalyst, the solid modified in reaction stage B) is reacted in reaction stage A with peroxy compound(s) and with halogen-containing metal compound(s) of one or more elements of the IV and/or V subgroup(s) of the Periodic Table.

In this process it is possible first to meter the mentioned metal compound(s) of the subgroup elements and then the peroxy compound(s) into the (primary) solid or to meter in both components simultaneously to the magnesium-containing solid, but, preferably, the suspension of the (primary) solid is treated first with the peroxy compound(s) and the at least one metal compound is added subsequently.

Alternatively, of course, the suspension of the solid may be metered into the mentioned reactants (peroxy compound and subgroup metal compound), but in that case preferably the one reactant does not come into contact with the other reactant before it has been combined with the primary solid or that modified in reaction stage B.

The reaction of the peroxy compound(s) with the solid suspension is advantageously carried out at from −20° to 100° C., preferably at from 0° to 100° C., and the reaction of the at least one metal compound with the solid suspension is carried out advantageously at from −20° C. to 150° C., preferably at from 0° to 150° C., and especially at from 50° to 100° C.

If the halogen-containing metal compounds of metals of the IV and/or V subgroup(s) of the Periodic Table are liquid, they may be used in that state but, preferably, and if they are not liquid, they are used in an as concentrated as possible solution in hydrocarbons.

The reaction times of this reaction stage A are not critical and may range from a few minutes (for example, 5 minutes) to several hours (for example, 4 hours).

When carrying out reaction stage A after reaction stage B, it is in many cases advantageous, prior to adding the halogen-containing subgroup metal compound(s), substantially to free the solid treated in stage A, preferably first of all only with the peroxy compound(s), from soluble compounds, by repeated washing with hydrocarbons, sedimentation and decanting.

Examples of peroxy compounds that can be used in accordance with the invention are alkyl hydroperoxides, dialkyl peroxides, diacyl peroxides, peroxycarboxylic acids, peroxysulfonic acids, alkyl esters of those acids, ketone peroxides, perketals and hydrogen peroxides having from 2 to 20 carbon atoms. Preferably the peroxy compounds are dialkylperoxy alkanes having from 5 to 26 carbon atoms, such as 2,2-bis-(tert.-butylperoxy)-butane; dialkylperoxy cycloalkanes having from 8 to 20 carbon atoms, such as 1,1-bis-(tert.-butylperoxy)-cyclohexane, 1,1-bis-(tert.-butylperoxy)-3,3,5-trimethyl cyclohexane; dialkylperoxides having from 6 to 20 carbon atoms, such as di-tert.-butylperoxide; diphenylalkylperoxides having from 18 to 26 carbon atoms, such as dicumylperoxide, alkyl hydroperoxides having from 3 to 20 carbon atoms, such as tert.-butylhydroperoxide, cycloalkylalkyl hydroperoxides having from 8 to 20 carbon atoms, such as pinane-hydroperoxide; and phenylalkyl hydroperoxides having from 9 to 20 carbon atoms, such as cumeme-hydroperoxide. These are collectively alkyl hydroperoxides and dialkyl peroxides having from 5 to 26 carbon atoms.

The peroxy compounds can be used alone or in admixture, either in pure form or mixed in a manner known per se with stabilizing agents.

Halogen-containing metal compounds of elements of subgroup(s) IV and V of the Periodic Table are here preferably compounds of titanium, zirconium and vanadium, titanium compounds being especially preferred.

In reaction stage A of the catalyst production, compounds of the general formula:

$$X_a Ti(OR^3)_{4-a}$$

and, in reaction stage B, described in detail hereinafter, compounds of the general formula:

$$X'_b Ti(OR^4)_{4-b}$$

have proved especially suitable. In these formulae, each of X and X', independently of one another, represents halogen, especially chlorine, each of $R^3$ and $R^4$, independently of one another, represents identical or different, straight-chain or branched alkyl radicals having from 1 to 8 carbon atoms and/or hydrocarbon aryl radicals having from 6 to 8 carbon atoms, and each of a and b, independently of one another, represents 2, 3 or 4, preferably 4. The compounds may be used in pure form in each case, or as mixtures. Titanium tetrachloride is especially preferred in each case.

If reaction stage A is carried out as the first reaction stage in the preparation of the catalyst for the process according to the invention, the solid thus modified is then preferably freed from soluble metal compounds, especially titanium compounds at temperatures of from 0° to 100° C., especially from 20° to 100° C., by repeated washing with hydrocarbons, by allowing to settle and decanting.

Preferably, the solid is then, in its turn, like the primary solid prior to the first reaction stage, suspended in hydrocarbons. The remarks referring to the concentration again apply here. The process is carried out in an analogous manner when reaction stage B, described hereinafter, is carried out as the first reaction stage of the catalyst manufacture.

The solid modified in reaction stage A or, in the preferred manner of operation in which reaction stage A is carried out after reaction stage B, the primary solid is reacted in reaction stage B with at least one halogen-containing compound of at least one element of the IV and/or V subgroup(s) of the Periodic Table, as defined hereinbefore, and with at least one organometallic compound of a metal of the II and/or III main group(s) of the Periodic Table.

The reaction is preferably carried out at temperatures of from −40° to 100° C., especially from −5° to 70° C.

The elements of the II and III main groups of the Periodic Table are understood to mean, in particular, beryllium, magnesium, boron, and aluminum, preferably magnesium and especially aluminum.

The organometallic compounds of these elements are understood to mean those that contain the metal atoms bonded to alkyl radicals having from 1 to 20 carbon atoms and/or hydrocarbon aryl radicals having from 6 to 20 carbon atoms. Valencies of the metals not bonded to these said radicals may, furthermore, be satisfied by hydrogen and/or by halogen, preferably chlorine, and also by alkoxy and/or siloxy radicals, each having from 1 to 20 carbon atoms and/or hydrocarbon aryloxy radicals having from 6 to 20 carbon atoms. Furthermore, oligomeric alkyl aluminum compounds may be used, that is to say, compounds which, in addition to the above-mentioned substituents, also contain aluminum-oxygen-aluminum bonds.

Compounds of the formula:

$$AlR^5_z Y_{3-z}$$

described in detail hereinafter and/or oligomers of these compounds are preferred. Examples of preferred compounds of this kind are the following:
triethyl aluminum
tri-n-butyl aluminum
triisobutyl aluminum
tri-n-octyl aluminum
"isoprenyl" aluminum
diethyl aluminum hydride
diisobutyl aluminum hydride
ethyl aluminum dichloride
diethyl aluminum chloride
ethyl aluminum sesquichloride
diethyl-ethoxy aluminum
(ethyldimethylsiloxy)-diethyl aluminum
bis(diisopropyl aluminum) oxide,
and mixtures there of.

In the above-described reaction stage B, diethyl aluminum chloride, ethyl aluminum sesquichloride, "isoprenyl" aluminum, tri-n-octyl aluminum or mixtures of these compounds are especially preferred.

The reaction time of reaction stage B may vary from a few minutes (for example, 15 minutes) to several hours (for example, 2 hours) and is not critical.

Reaction stage B can be carried out in such a manner that first of all the main group compounds, preferably dissolved in a hydrocarbon, for example, those of the above-mentioned aluminum compounds, and the primary solid, preferably suspended in hydrocarbons, or the solid modified in stage A, preferably suspended in hydrocarbons, are combined, and thereafter the subgroup compounds, likewise preferably dissolved in hydrocarbons, for example, the preferred titanium tetrachloride, are metered in. Simultaneous addition of the components is also possible. Preferably, however, the subgroup compound, for example, the preferred titanium tetrachloride, and the solid, both preferably dissolved or suspended, respectively, in hydrocarbons, are introduced and the main group compounds, preferably the organyl aluminum compounds, are then added thereto.

In a preferred embodiment, to modify the primary solid, a total of 0.015 to 50 mols, especially 0.11 to 15 mols, of halogen-containing metal compounds of elements of subgroup(s) IV and/or V, especially titanium tetrachloride, are used per mol (gram atom) of magnesium bonded in the solid in reaction stages A and B together. Of that amount, based on 1 mol of bonded magnesium, preferably 0.01 to 5 mols, especially 0.1 to 1 mol, are used in reaction stage B. Furthermore, in reaction stage B of this preferred embodiment, there are used, per mol of the mentioned metal compounds employed therein, from 0.3 to 5 mols, especially 0.5 to 2.5 mols, of organometal compounds of elements of main group(s) II and/or III.

The remaining amount of metal compound(s) of the mentioned subgroup elements, in the same preferred embodiment, is used in reaction stage A together with such an amount of peroxy compound(s) that 0.001 to 5 mols, especially 0.01 to 1 mol, of active oxygen are present per mol of magnesium bonded in the (primary) solid. In this embodiment, the peroxy compound is mostly used in stoichiometric amount in relation to the mentioned metal compounds of the subgroup elements. It is obviously possible to deviate from the mentioned amounts, but is not expedient and, therefore, also not preferred since, if the lower limits are not met, the activity of the catalyst solid in most cases drops markedly while, if the upper limits are exceeded, no additional advantages corresponding to the extra expenditure can be achieved.

One mol of a mixture of substances means that amount of the mixture which theoretically (conversion = 100% of the theoretical value) reacts with the same amount of a reactant as would one mol of a pure substance that is contained in the mixture of substances.

advantage of the catalyst system is the manufacture of polymerizates having excellent powder properties, a broad distribution of molecular weight, very good physical properties and good processibility. For example, the polymerizates manufactured according to the invention can be shaped by blow-extrusion "free of melt fractures," for example, to form hollow articles or sheet materials. Of the very good physical properties, only the high rigidity, the impact strength and the good stress crack resistance are mentioned.

The invention is explained in detail hereinafter by Examples and Comparison Examples. These are not to be deemed limitative, however.

EXAMPLES

The melt index $MFI_5$ mentioned in the Examples is determined in accordance with DIN 53 735 (Deutsche Industrie Norm, German Industrial Standard) at 190° C. and 49.03 N (5 kp) stress.

The flow factor $F_{21.6}$ is the quotient of the melt indices at 211.82 N (21.6 kp) an 49.03 N (5 kp) stress and can be employed as a measure of the molecular weight distribution.

The catalyst which is used in the polymerization according to the invention, for example, can be manufactured in the following manners:

A. Manufacture of the Primary Solid 900 ml of a hexane/heptane solution, which contained 0.5 mol of an n-butyl-sec-butyl magnesium, were metered in over a period of two hours at 60° C. into 1 mol of chloroform in 420 ml of isooctane. A brown solid was formed. The mixture was stirred for approximately one-half hour at 60° C. and then the solid was washed at 50° C. to 60° C. three times with three liters of isooctane each time, with repeated settling and decanting. The mixture was then brought to one liter.

B. Manufacture of the Catalyst Solid (1) Stage B, followed by Stage A 100 ml of the primary solid suspension produced according to A, which contained 50 mmols of magnesium, were introduced into the reaction vessel and 30 mmols of $TiCl_4$ and 60 mmols of ethyl aluminum sesquichloride dissolved in 30 ml of isooctane were added at room temperature while stirring. After heating to 50° C., stirring was carried out for one and one-half hours followed by washing with isooctane at that temperature, with repeated sedimentation and decanting, until practically no aluminum and no chloride could be detected in the decanted liquid.

The solid contained 27.9 mmols of bonded titanium.

After taking the solid up in 150 ml of isooctane, 7.5 mmols of di-t-butyl peroxide, dissolved in 20 mol of isooctane, were metered in at 50° C., while stirring, over a period of one-half hour. The suspension was then heated to 80° C., stirred for one hour, cooled to 50° C. and washed four times with 150 ml of isooctane each time. After taking up the solid in 100 ml of isooctane, 136 mmols of $TiCl_4$ were added. The mixture was then heated to 90° C., stirred for one-half hour at that temperature, cooled to 50° C. and washed with isooctane, with repeated sedimentation and decanting, until practically no titanium or chloride could be detected in the decanted liquid.

For the subsequent treatment, the solid was suspended in 300 ml of isooctane again and aged for three hours at 90° C. After repeated extraction by washing with isooctane at 50° C., the catalyst solid contained a total of 28.4 mmols of bonded titanium.

B. (2) Stage B, followed by Stage A 100 ml of the primary solid suspension produced according to A, which contained 50 mmols of magnesium, were introduced into the reaction vessel and 20 mmols of $TiCl_4$ and 40 mmols of ethyl aluminum sesquichloride, dissolved in 20 ml of isooctane, were added at room temperature, while stirring. After heating to 50° C., the mixture was stirred for one and one-half hours and washed at that temperature with isooctane, with repeated sedimentation and decanting, until practically no aluminum or chloride could be detected in the decanted liquid.

The solid contained 19.1 mmols of bonded titanium.

After taking up the solid in 150 ml of isooctane, 10 mmols of di-t-butyl peroxide, dissolved in 20 ml of isooctane, were metered in at 50° C., while stirring over a period of one-half hour. The suspension was then heated to 80° C., stirred for one hour, cooled to 50° C. and washed four times with 150 ml of isooctane each time. After taking up the solid in 100 ml of isooctane, 45.5 mmols of $TiCl_4$ were added. The mixture was then heated to 90° C., stirred for one-half hour at that temperature, cooled to 50° C. and washed with isooctane, with repeated sedimentation and decanting, until practically no titanium or chloride could be detected in the decanted liquid.

For the subsequent treatment, the solid was suspended in 300 ml of isooctane again and aged for three hours at 90° C. After repeated extraction by washing with isooctane at 50° C., the catalyst solid contained a total of 19.3 mmols of bonded titanium.

B (3) Stage B, followed by Stage A 100 ml of the primary solid suspension produced according to A, which contained 50 mmols of magnesium, were introduced into the reaction vessel and 20 mmols of $TiCl_4$ and 40 mmols ethyl aluminum sesquichloride, dissolved in 20 ml of isooctane, were added at room temperature, while stirring. After heating to 50° C., the mixture was stirred for one and one-half hours and washed with isooctane at that temperature, with repeated sedimentation and decanting, until practically no aluminum or chloride could be detected in the decanted liquid.

The solid contained 19.6 mmols of bonded titanium.

After taking up the solid in 150 ml of isooctane, 10 mmols of t-butylhydroperoxide were added at 50° C., while stirring. The suspension was then heated to 80° C., stirred for one hour, cooled to 50° C. and washed four times with 150 ml of isooctane each time. After taking up the solid in 100 ml of isooctane, 91 mmols of $TiCl_4$ were added. The mixture was then heated to 90° C., stirred for one-half hour at that temperature, cooled to 50° C. and washed with isooctane with repeated sedimentation and decanting until practically no titanium or chloride could be detected in the decanted liquid. For the subsequent treatment, the solid was suspended in 300 ml of isooctane again and aged for three hours at 90° C. After repeated extraction by washing with isooctane at 50° C., the catalyst solid contained a total of 21.6 mmols of bonded titanium.

B. (4) Stage A, followed by Stage B 100 ml of the primary solid suspension produced according to A, which contained 50 mmols of magnesium, were introduced into the reaction vessel and 15 mmols of t-butylhydroperoxide were added at room temperature, while stirring. After heating to 80° C., the Preferably, after modification in the two reaction stages A and B, at temperatures of from 0° to 100° C., the solid catalyst is substantially freed from soluble compounds by repeated washing with hydrocarbons, sedimentation and decanting.

Additionally, or alternatively, it may be advantageous, especially when reaction stage B is carried out before reaction stage A as is especially preferred, to subject the solid catalyst after the second reaction stage to a subsequent treatment. This subsequent treatment is carried out by reacting a stirrable suspension of the catalyst solid in hydrocarbons with one or more organyl metal compounds, preferably likewise dissolved in hydrocarbons, of the II and/or III subgroup(s) of the Periodic Table, as already defined hereinbefore. Of the preferred organyl aluminum compounds, in particular, diethyl aluminum chloride, ethyl aluminum sesquichloride, "isoprenyl" aluminum, tri-n-octyl aluminum and mixtures thereof, are especially preferred.

This additional subsequent treatment of the catalyst solid is preferably carried out at temperatures of from −40° to 150° C., especially from −20° to 100° C., with the use of preferably from 0.01 to 5 mols, especially from 0.1 to 1 mol, of the organyl metal compound(s) per mol of magnesium bonded in the solid.

The remarks made initially referring to the concentration of the solid suspension apply equally to all states of the catalyst production. The reaction time of the subsequent treatment may likewise range from a few minutes to several hours (for example 15 minutes to 2 hours).

A further advantageous possibility for the subsequent treatment, whether reaction stage A is carried out before or after reaction stage B, consists of ageing the solid in suspension for several hours, for example, for 2 to 8 hours, at temperatures of from 50° to 100° C., and then washing it again.

The preparation of the catalyst solid in reaction stage B and the execution of the polymerization according to the invention must be carried out with the exclusion of even small quantities of oxygen and water or water vapor.

The catalyst solid prepared in the above-described manner which has been freed, especially from soluble metal compounds, preferably by washing with hydrocarbons, preferably at temperatures of from 0° to 100° C., allowing to settle and decanting, is suitable for use in the polymerization according to the invention of those α-olefins which it was previously possible to polymerize in the presence of catalysts in the "Ziegler" type at pressures ranging from approximately 2 to 40 bar in the gaseous phase or in dispersion. In a preferred embodiment of the process according to the invention, ethylene in admixture with from 0 to 10 mol percent of α-olefins, especially α-alkenes, having from 3 to 6 carbon atoms, for example, propene, but-1-ene, isobutene, pent-1-ene and hex-1-ene, is used and (co)polymerized.

Especially good results are obtained when ethylene is homopolymerized.

The polymerization initiated with the above-described catalyst system can be carried out in the gaseous phase or in suspension. In the preferred polymerization in suspension, the reactants, preferably dispersed in a hydrocarbon or a hydrocarbon mixture, are polymerized at pressures of from 2 to 40 bar (absolute), preferably from 2 to 11 bar, and at temperatures of from 60° C. to 100° C. The chain length of the resulting polymerizates can be regulated optionally by the addition of hydrogen, or, in other words, the polymerization degree of the products can be regulated.

The hydrocarbons employed are understood in the scope of this application to be saturated compounds which are composed of the elements carbon and hydrogen, such as straight-chain, branched and cyclic alkanes or paraffin hydrocarbons which are predominantly liquid at the stated temperatures and pressures, for example, alkanes having from 3 to 20 carbon atoms. Examples are propane, the butanes, the pentanes, the hexanes, the heptanes, the octanes, the nonanes, the decanes, decalin, cyclohexane and mixtures thereof.

To initiate the polymerization, the catalyst solid is activated by the addition of organyl metal compound(s) of metals of the II and/or III main group(s) of the Periodic Table to the polymerization mixture.

Of the above already defined compounds of this kind, aluminum organic compounds of the general formula:

$$AlR^5_zY_{3-z}$$

or mixtures thereof are preferred, wherein $R^5$ represents identical or different, straight-chain or branched alkyl radicals having from 1 to 20 carbon atoms and/or hydrocarbon aryl radicals having from 6 to 20 carbon atoms, Y represents hydrogen and/or identical or different halogen atoms, alkoxy radicals, and/or siloxy radicals, each having from 1 to 20 carbon atoms and/or hydrocarbon aryloxy radicals having from 6 to 20 carbon atoms, and z is 2 or 3. Especially preferred are triisobutyl aluminum, tri-n-octyl aluminum and "isoprenyl" aluminum and mixtures thereof.

The oligomeric organyl aluminum compounds already described in the description of reaction stage B may also be used here.

The organyl metal compound of metals of the II and/or III main group(s) of the Periodic Table are preferably used in excess compared with the subgroup elements of the IV and V main groups bonded in the solid catalyst. It is, of course, also possible to use a deficiency or stoichiometric amounts. In a preferred embodiment, for example, from 2 to 100, especially from 5 to 50, mols of at least one aluminum compound is used per mol of titanium contained and chemically bonded in the catalyst solid.

The polymerization process according to the invention can be carried out continuously or discontinuously. In the discontinuous method, catalyst solid manufactured in the above-described manner, activator, α-olefin, optionally at least one hydrocarbon and optionally hydrogen are introduced into the reactor, preferably an autoclave, and the polymerization is then carried out. Of course, individual components or all of the components may be metered in subsequently, as a whole or partially.

In the continuous method, the said reactants are fed into the reactor continuously, separately or as a mixture, in the desired composition. Here, too, subsequent metering-in of partial amounts of individual components or all of the components is possible, and when using, for example, tube reactors, also metering in at different points of the reactor can be followed.

By the process according to the invention, polymerizates may be obtained which need not be subjected to any further treatment. This is achieved because of the small amount of catalyst system required as a result of its surprisingly high activity which does not have any marked detrimental effect on the product. A further suspension was stirred for one hour; then 100 mmols of TiCl₄ were added and stirring was continued for a further two hours at 90° C.

After cooling to 50° C., the solid extracted by washing, with repeated sedimentation and decanting, until practically no titanium or chloride could be detected in the decanted isooctane.

The solid contained 19.2 mmols of bonded titanium.

After taking up the solid in 130 ml of isooctane, 20 mmols of TiCl₄ and then 40 mmols of ethyl aluminum sesquichloride, dissolved in 20 ml of isooctane, were added at room temperature, while stirring. After heating to 50° C., stirring was carried out for one and one-half hours at that temperature, followed by washing until practically no aluminum or chloride could be detected in the decanted isooctane.

The catalyst solid contained a total of 39 mmols of bonded titanium.

C. Manufacture of a Catalyst Solid not According to the Invention.

100 ml of the primary solid suspension produced according to A, which contained 50 mmols of magnesium, were introduced into the reaction vessel and 20 mmols of TiCl₄ and 40 mmols of ethyl aluminum sesquichloride, dissolved in 20 ml of isooctane, were added at room temperature, while stirring. After heating to 50° C., the suspension was stirred for one and one-half hours and washed with isooctane at that temperature, with repeated sedimentation and decanting, until practically no aluminum or chloride could be detected in the decanted liquid.

For the after-treatment, the solid was suspended in 300 ml of isooctane and aged for three hours at 90° C. After repeated washing with isooctane at 50° C., the catalyst solid contained a total of 17.8 mmols of bonded titanium.

EXAMPLES 1 TO 9 AND COMPARISON EXAMPLES A AND B

The polymerization of ethylene was carried out in a 5-liter laboratory autoclave in 3500 ml of isooctane while stirring at 650 min⁻¹, at a total pressure of 10 bar.

The tests and the polymerizaton results are summarized in Table 1.

Whereas it was possible to extrude the products of Examples 1 to 9 "without melt fracture," the extruded products of Comparison Examples A and B eto the invention can be extruded with higher output rates in comparison to Examples A and B. This fact also demonstrates that the molecular weight distribution of Examples 1 to 9 is broader than the molecular weight distribution of Comparison Examples A and B.

TABLE 1

| Examples and Comparison Examples | Catalyst Produced According to | mg Ti (1) | 2 ml AlR₃⁵ | Vol-% H₂ in Gas Space | °C. | Time in Hours | gm PE (2) | MFI₅/F₂₁.₆ (Powder) | MFI₅/F₂₁.₆ (Granulate) | Bulk Density gm/l | Proportion of Fines 100 μm in % |
|---|---|---|---|---|---|---|---|---|---|---|---|
| 1 | B(1) | 18.9 | Al-isoprenyl | 24.5 | 90 | 2 | 1110 | 0.33/17.9 | 0.28/18.9 | 440 | 0.2 |
| 2 | " | 20.1 | " | 33 | 90 | 2 | 1080 | 1.30/16.5 | 1.10/18.2 | 455 | 0.2 |
| 3 | B(2) | 16.5 | " | 32 | 90 | 1¾ | 1160 | 1.30/15.6 | 1.20/17.4 | 385 | 0.0 |
| 4 | B(3) | 15.4 | " | 27 | 90 | 2 | 1095 | 0.31/18.1 | 0.28/20.7 | 450 | 0.2 |
| 5 | " | 15.4 | " | 24.5 | 90 | 2 | 1125 | 0.32/17.7 | 0.26/20.8 | 455 | 0.1 |
| 6 | " | 16.5 | Al(n-C₈H₁₇)₃ | 24 | 90 | 1¾ | 1151 | 0.29/16.2 | 0.23/20.0 | 385 | 0.0 |
| 7 | B(4) | 19.4 | Al-isoprenyl | 20 | 90 | 2 | 1120 | 0.44/15.1 | 0.39/16.8 | 345 | 0.1 |
| 8 | " | 19.4 | " | 17 | 90 | 2 | 1100 | 0.43/15.4 | 0.39/17.1 | 355 | 0.0 |
| 9 | " | 23.0 | " | 28 | 90 | 2¾ | 1150 | 1.3/15.3 | 1.2/16.9 | 350 | 0.0 |
| A | C | 14.0 | Al-isoprenyl | 23 | 90 | 2 | 1280 | 0.34/14.6 | 0.30/15.7 | 380 | 0.2 |
| B | C | 14.0 | Al(n-C₈H₁₇)₃ | 26 | 90 | 2 | 1235 | 0.45/15.1 | 0.41/16.0 | 375 | 0.3 |

(1) Bonded to the catalyst solid
(2) Polyethylene

The preceding specific embodiments are illustrative of the practice of the invention. It is to be understood, however, that other expedients known to those skilled in the art or described herein, may be employed without departing from the spirit of the invention or the scope of the appended claims.

I claim:

1. An improvement in the process for the polymerization of an at least one α-olefin comprising reacting said α-olefin under elevated temperatures and pressures in the presence of a solid polymerization catalyst consisting essentially of a solid compound containing:
   (1) titonium
   (2) magnesium,
   (3) halogen,
   (4) oxygen, and possibly
   (5) element(s) of the II and/or III main group(s) of the Mendeleev Periodic Table, which solid compound is activated with at least one organometallic compound where said metal is from the II and/or III main group(s) of the Mendeleev Periodic Table, and recovering a polymerizate, the improvement consisting of preparing said solid compound prior to activation, by reacting a primary solid containing magnesium and halogen prepared from at least one hydrocarbon-soluble magnesium compound and at least one halogen compound selected from the group consisting of a chlorohydrocarbon having from 1 to 6 carbon atoms of which at least one carbon atom has at least two directly bonded chlorine atoms, a carbon chloride compound having from 1 to 6 carbon atoms, and mixtures thereof, in two successive and separate reacting stages A and B, in either order, where a solid based on magnesium compound(s) is reacted in reaction stage A in suspension in at least on liquid hydrocarbon with:
   (i) at least one peroxy compound selected from the group consisting of dialkyl peroxides, alkyl hydroperoxides, and mixtures thereof, and
   (ii) at least one halogen-containing titanium compound of the formula:

$$X_aTi(OR^4)_{4-a}$$

wherein X represents halogen, R⁴ is a substituent selected from the group consisting of alkyl having from 1 to 8 carbon atoms and hydrocarbon aryl having from 6 to 8 carbon atoms, and a is 2, 3 or 4, and, in reaction stage B, a solid based on magnesium compound(s) in suspension in at least one liquid hydrocarbon is reacted with:
  (i) at least one halogen-containing titanium compound of the formula:

$$X'_b Ti(OR^3)_{4-b}$$

wherein X' represents halogen, R³ represents a substituent selected from the group consisting of alkyl having from 1 to 8 carbon atoms and hydrocarbon aryl having from 6 to 8 carbon atoms, and b is 2, 3 or 4, and
  (ii) at least one organoaluminum compound,
whereby a polymerizate is recovered having a broad molecular weight distribution.

2. The process of claim 1 wherein said at least one halogen compound is a chloroalkane having from 1 to 6 carbon atoms where at least one carbon atom has at least two directly bonded chlorine atoms.

3. The process of claim 1 wherein said reaction stage B occurs before said reaction stage A.

4. The process of claim 1 wherein said reaction stage A occurs before said reaction stage B.

5. The process of claim 1 wherein component (ii) in stage A is titanium tetrachloride.

6. The process of claim 1 wherein component (i) in stage B is titanium tetrachloride.

7. The process of claim 1 or 2 wherein said catalyst solid, after completion of reaction stages A and B, is further washed with at least one liquid hydrocarbon, dispersed in at least one liquid hydrocarbon and reacted with at least one organometallic compound of metals of the II and/or III main group(s) of the Mendeleev Periodic Table, dissolved in at least one liquid hydrocarbon.

8. The process of claim 7 wherein said at least one organometallic compound is at least one organoaluminum compound.

9. The process of claim 1 wherein said catalyst solid, after completion of reaction stages A and B, is further suspended in at least one liquid hydrocarbon, aged for at least one hour at a temperature of from 50° C. to 100° C., and then washed with at least one liquid hydrocarbon.

10. The process of claim 1 or 2 wherein said organometallic compound where said metal is from the II and/or III main group(s) of the Mendeleev Periodic Table, as activator, is at least one organoaluminum compound selected from the group consisting of:
  (1) compounds of the formula:

$$Al R_z^5 Y_{3-z}$$

wherein R⁵ represents a member selected from the group consisting of alkyl having from 1 to 20 carbon atoms, hydrocarbon aryl having from 6 to 20 carbon atoms and mixtures thereof, Y represents a member selected from the group consisting of hydrogen, halogen, alkoxy having from 1 to 20 carbon atoms, siloxy having from 1 to 20 carbon atoms and hydrocarbon aryl having from 6 to 20 carbon atoms, and z is 2 or 3,
  (2) oligomeric alkyl aluminum compounds, and
  (3) mixtures thereof.

11. The process of claim 1 wherein the solid compound is purified after each stage.

12. The process of claim 11 wherein said purification after each stage is by washing with liquid hydrocarbons.

13. The process of claim 12 wherein said washing with liquid hydrocarbons is continued until said catalyst is substantially freed from soluble compounds.

14. An improvement in the process for the polymerization of an at least one α-olefin comprising reacting an α-olefin selected from the group consisting of ethylene and mixtures of ethylene with up to 10 mol percent of α-alkenes having from 3 to 6 carbon atoms under elevated temperatures and pressures in the presence of a solid polymerization catalyst consisting essentially of a solid compound containing:
  (1) titanium,
  (2) magnesium,
  (3) halogen,
  (4) oxygen, and possibly
  (5) element(s) of the II and/or III main group(s) of the Mendeleev Periodic Table,
which solid compound is activated with at least one organometallic compound where said metal is from the II and/or III main group(s) of the Mendeleev Periodic Table, and recovering a polymerizate, the improvement consisting of preparing said solid compound prior to activation, by reacting a primary solid containing magnesium and halogen prepared from at least one hydrocarbon-soluble magnesium compound and at least one halogen compound selected from the group consisting of a chlorohydrocarbon having from 1 to 6 carbon atoms of which at least one carbon atom has at least two directly bonded chlorine atoms, a carbon chloride compound having from 1 to 6 carbon atoms, and mixtures thereof, in two successive and separate reacting stages A and B, in either order, where a solid based on magnesium compound(s) is reacted in reaction stage A in suspension in at least one liquid hydrocarbon with:
  (i) at least one peroxy compound selected from the group consisting of dialkyl peroxides, alkyl hydroperoxides, and mixtures thereof, having from 5 to 26 carbon atoms, and
  (ii) at least one halogen-containing titanium compound of the formula:

$$X_a Ti(OR^6)_{4-a}$$

wherein X represents halogen, R⁶ is a substituent selected from the group consisting of alkyl having from 1 to 8 carbon atoms and hydrocarbon aryl having from 6 to 8 carbon atoms, and a is 2, 3 or 4,
and, in reaction stage B, a solid based on magnesium compound(s) in suspension in at least one liquid hydrocarbon is reacted with:
  (i) at least one halogen-containing metal titanium compound of the formula:

$$X'_b Ti(OR^7)_{4-b}$$

wherein X' represents halogen, R⁷ represents a substituent selected from the group consisting of alkyl having from 1 to 8 carbon atoms and hydrocarbon aryl having from 6 to 8 carbon atoms, and b is 2, 3 or 4, and
  (II) at least one organoaluminum compound,
whereby a polymerizate is recovered having a broad molecular-weight distribution.

15. The process of claim 14 wherein said primary solid containing magnesium and halogen is purified before further reaction and said solid based on magnesium compound(s) resulting from stage A or stage B are each purified before further processing.

16. The process of claim 15 wherein said purification after each stage is by washing with liquid hydrocarbons.

17. The process of claim 16 wherein said washing with liquid hydrocarbons is continued until said catalyst is substantially freed from soluble components.

* * * * *